(12) United States Patent
Ghabra et al.

(10) Patent No.: US 6,420,967 B1
(45) Date of Patent: Jul. 16, 2002

(54) SYSTEM AND METHOD FOR SHARED VEHICLE TIRE PRESSURE MONITORING, REMOTE KEYLESS ENTRY, AND VEHICLE IMMOBILIZATION

(75) Inventors: Riad Ghabra, Dearborn Heights; John S. Nantz, Brighton; Qingfeng Tang, Novi; Salman Khreizat, Dearborn, all of MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/773,105

(22) Filed: Jan. 31, 2001

(51) Int. Cl.[7] .............................................. B60C 23/00
(52) U.S. Cl. ..................... 340/447; 340/426; 307/10.2
(58) Field of Search ................................ 340/426, 430, 340/425.5, 445, 447, 539, 825.3, 442, 825.69, 825.71; 307/10.1, 10.2, 10.3, 10.8; 342/42

(56) References Cited

U.S. PATENT DOCUMENTS

| | | | |
|---|---|---|---|
| 4,163,208 A | 7/1979 | Merz | 73/146.5 |
| 5,109,213 A | 4/1992 | Williams | 340/447 |

(List continued on next page.)

FOREIGN PATENT DOCUMENTS

| | | |
|---|---|---|
| EP | 0 565 099 A1 | 10/1993 |
| EP | 0 612 632 A2 | 8/1994 |
| EP | 0 671 289 A1 | 9/1995 |
| WO | WO 92/20539 | 11/1992 |
| WO | WO 94/18018 | 8/1994 |
| WO | WO 98/26946 | 6/1998 |
| WO | WO 99/08887 | 2/1999 |
| WO | WO 00/34061 | 6/2000 |
| WO | WO 00/34062 | 6/2000 |
| WO | WO 00/34063 | 6/2000 |

OTHER PUBLICATIONS

Article from Popular Mechanics, Mar. 1973, vol. 139, No. 3.

Primary Examiner—Brent A. Swarthout
(74) Attorney, Agent, or Firm—Brooks & Kushman, PC

(57) ABSTRACT

A combined vehicle remote access, tire monitoring and vehicle immobilization system and method including a tire monitor for monitoring a tire parameter, the monitor including a transmitter for transmitting a radio frequency tire data signal, a vehicle access transmitter for transmitting a radio frequency vehicle access signal, and a vehicle activation transponder for receiving an interrogation signal and transmitting a vehicle activation signal for use in vehicle immobilization. The system and method further include a control module having a receiver and a controller for receiving and processing the tire data, vehicle access, and vehicle activation signals, and generating a display signal to display the information represented by the tire data signal, a vehicle access control signal to perform the vehicle access function, and a vehicle immobilization control signal to immobilize the vehicle if the controller fails to authenticate the vehicle activation signal.

16 Claims, 3 Drawing Sheets

U.S. PATENT DOCUMENTS

| | | | |
|---|---|---|---|
| 5,285,189 A | 2/1994 | Nowicki et al. | 340/447 |
| 5,289,160 A | 2/1994 | Fiorletta | 340/447 |
| 5,289,369 A | 2/1994 | Hirshberg | 340/993 |
| 5,444,448 A | 8/1995 | Schuermann et al. | 342/42 |
| 5,461,385 A | 10/1995 | Armstrong | 342/42 |
| 5,463,374 A | 10/1995 | Mendez et al. | 340/442 |
| 5,483,827 A | 1/1996 | Kulka et al. | 73/146.5 |
| 5,500,637 A | 3/1996 | Kokubu | 340/447 |
| 5,552,789 A * | 9/1996 | Schuermann | 342/42 |
| 5,585,554 A | 12/1996 | Handfield et al. | 73/146.5 |
| 5,600,301 A | 2/1997 | Robinson, III | 340/442 |
| 5,602,524 A | 2/1997 | Mock et al. | 340/447 |
| 5,654,689 A | 8/1997 | Peyre et al. | 340/426 |
| 5,661,651 A * | 8/1997 | Geschke et al. | |
| 5,670,933 A | 9/1997 | Hayashi | 340/426 |
| 5,677,667 A | 10/1997 | Lesesky et al. | 340/431 |
| 5,717,376 A | 2/1998 | Wilson | 340/442 |
| 5,724,028 A | 3/1998 | Prokup | 340/825.31 |
| 5,822,683 A | 10/1998 | Paschen | 340/572 |
| 5,835,868 A | 11/1998 | McElroy et al. | 340/426 |
| 5,965,808 A | 10/1999 | Normann et al. | 73/146.5 |
| 5,973,611 A * | 10/1999 | Kulha et al. | 340/825.31 |
| 6,018,993 A | 2/2000 | Normann et al. | 73/146.5 |
| 6,034,597 A | 3/2000 | Normann et al. | 340/447 |
| 6,043,752 A | 3/2000 | Hisada et al. | 340/825.31 |
| 6,078,252 A * | 6/2000 | Kulczycki et al. | 340/425.5 |
| 6,112,165 A | 8/2000 | Uhl et al. | 73/146.5 |
| 6,124,786 A | 9/2000 | Normann et al. | 340/447 |
| 6,155,119 A | 12/2000 | Normann et al. | 73/756 |
| 6,169,480 B1 | 1/2001 | Uhl et al. | 340/442 |
| 6,181,241 B1 | 1/2001 | Normann et al. | 340/447 |
| 6,194,999 B1 | 2/2001 | Uhl et al. | 340/447 |
| 6,232,875 B1 * | 5/2001 | Dezorzi | 340/42 |

* cited by examiner

SYSTEM AND METHOD FOR SHARED VEHICLE TIRE PRESSURE MONITORING, REMOTE KEYLESS ENTRY, AND VEHICLE IMMOBILIZATION

TECHNICAL FIELD

The present invention relates generally to wireless vehicle tire pressure monitoring, vehicle remote keyless access, and vehicle immobilization and, more particularly, to a system and method employing a combined receiver for shared vehicle tire pressure monitoring, remote keyless entry, and immobilization functions.

BACKGROUND ART

It is well known in the automotive industry to provide for remote keyless entry (RKE) to a vehicle through the use of a hand held transmitter, which is commonly referred to as a "fob." Currently available RKE fobs may be separate units, or may be part of an ignition keyhead, preferably along with a vehicle immobilization transponder. Such RKE fobs generally utilize an antenna to transmit radio frequency (RF) signals to a vehicle in order to lock or unlock vehicle doors, open or close a vehicle sliding door, unlock a vehicle trunk, activate internal and/or external vehicle lights, and/or activate a "panic" alarm. Remote access systems using such RKE fobs typically employ on-off keying (OOK) or amplitude shift keying (ASK) modulation schemes for the RF signals.

It is also known in the industry to provide for wireless monitoring of vehicle tire parameters, particularly tire pressure. An exemplary tire monitoring system is described and shown in U.S. Pat. Nos. 5,600,301 and 5,463,374, which also describes a vehicle remote access device. In such tire monitoring systems, RF transmitters mounted inside each tire, typically adjacent the inflation valve stem, transmit information concerning tire pressure to a receiver located on-board the vehicle. The information delivered by the RF signals from the transmitters is subsequently conveyed to a vehicle operator, typically in the form of a display. Like vehicle remote access systems, such tire monitoring systems also typically employ OOK or ASK modulation schemes for the RF signals. When such modulation schemes are used, however, there can be strong adverse effects on reception of the RF signal, because the amplitude of a signal transmitted from a rotating tire can vary significantly during the period of the transmission.

Finally, in order to deter theft, it is also known in the automotive industry to provide systems for vehicle immobilization. U.S. Pat. No. 5,670,933 illustrates an example of such an immobilization system. Such vehicle anti-theft devices typically employ low frequency (LF) transponders in a vehicle ignition keyhead. In such systems, upon insertion of the vehicle ignition key into the vehicle ignition keyhole, an interrogation signal is sent by the vehicle. In response, the keyhead transponder transmits an encrypted code to a control unit, such as a microprocessor, on-board the vehicle. If the code sent by the transponder is valid (i.e., the control unit authenticates the received code), then the control unit generates a signal operative to permit the vehicle to be activated. However, if the code is not received by the control unit, or if the code is not valid (i.e., the control unit cannot authenticate the received code), then the control unit generates a signal operative to immobilize the vehicle, for example by cutting off the fuel supply to the vehicle engine.

It would be desirable to provide a system and method for shared vehicle remote access, tire monitoring and vehicle immobilization. Such a combined system and method would provide an improved and simplified design for such functionality, thereby optimizing performance and providing a cost advantage. In particular, such a system and method would preferably employ a combined RKE, tire monitoring and vehicle immobilization receiver and a single microprocessor controller. Such a system and method would also preferably use an OOK or ASK modulation scheme for RKE, while employing a more advantageous frequency shift keying (FSK) modulation scheme for tire monitoring, thereby overcoming the problems of the prior art tire monitoring systems described above. Still further, such a system and method would also preferably provide an advantageous RF link for use in vehicle immobilization.

SUMMARY OF THE INVENTION

Accordingly, it is an object of the present invention to provide a system and method for shared vehicle remote access, tire monitoring and vehicle immobilization functions in order to improve performance and reduce expense. In that regard, it is a further object of the present invention to preferably employ a combined remote keyless entry (RKE), tire monitoring and vehicle immobilization receiver and a single microprocessor controller. It is also an object of the present invention to preferably use an on-off keying (OOK) or amplitude shift keying (ASK) modulation scheme for RKE, while preferably employing a more advantageous frequency shift keying (FSK) modulation scheme for tire monitoring, as well as to preferably provide an advantageous radio frequency (RF) link for use in vehicle immobilization.

According to the preferred embodiment of the present invention, a combined vehicle remote access, tire monitoring and vehicle immobilization system is provided for use with an automotive vehicle. The system comprises a tire monitor for mounting in a vehicle tire for monitoring at least one tire parameter, the monitor including a transmitter for transmitting a radio frequency tire data signal representing information concerning the at least one tire parameter. a handheld remote vehicle access transmitter for transmitting a radio frequency vehicle access signal for use in performing at least one vehicle access function, and a vehicle activation transponder for receiving an interrogation signal and transmitting a vehicle activation signal for use in a vehicle immobilization function. The system further comprises a control module for mounting on-board the vehicle, the control module including a receiver for receiving the tire data, vehicle access, and vehicle activation signals, and a controller for processing the tire data, vehicle access, and vehicle activation signals and generating a display signal operative to display to a vehicle operator the information represented by the tire data signal, a vehicle access control signal operative to perform the at least one vehicle access function, and a vehicle immobilization control signal operative to immobilize the vehicle if the controller fails to authenticate the vehicle activation signal.

According to another aspect of the present invention, a method for combined vehicle remote access, tire monitoring and vehicle immobilization is also provided for use with an automotive vehicle. The method comprises providing a tire monitor for mounting in a vehicle tire for monitoring at least one tire parameter, the monitor including a transmitter for transmitting a radio frequency tire data signal representing information concerning the at least one tire parameter, providing a handheld remote vehicle access transmitter for transmitting a radio frequency vehicle access signal for use in performing at least one vehicle access function, and providing a vehicle activation transponder for receiving an interrogation signal and transmitting a vehicle activation signal for use in a vehicle immobilization function. The method further comprises providing a control module for mounting on-board the vehicle, the control module including a receiver for receiving the tire data, vehicle access, and vehicle activation signals, and a controller for processing the tire data, vehicle access, and vehicle activation signals and generating a display signal operative to display to a vehicle operator the information represented by the tire data signal, a vehicle access control signal operative to perform the at least one vehicle access function, and a vehicle immobilization control signal operative to immobilize the vehicle if the controller fails to authenticate the vehicle activation signal.

These and other objects, features and advantages of the present invention will be readily apparent upon consideration of the following detailed description of the invention in conjunction with the accompanying drawings.

BEST MODE FOR CARRYING OUT THE INVENTION

Figure 1:
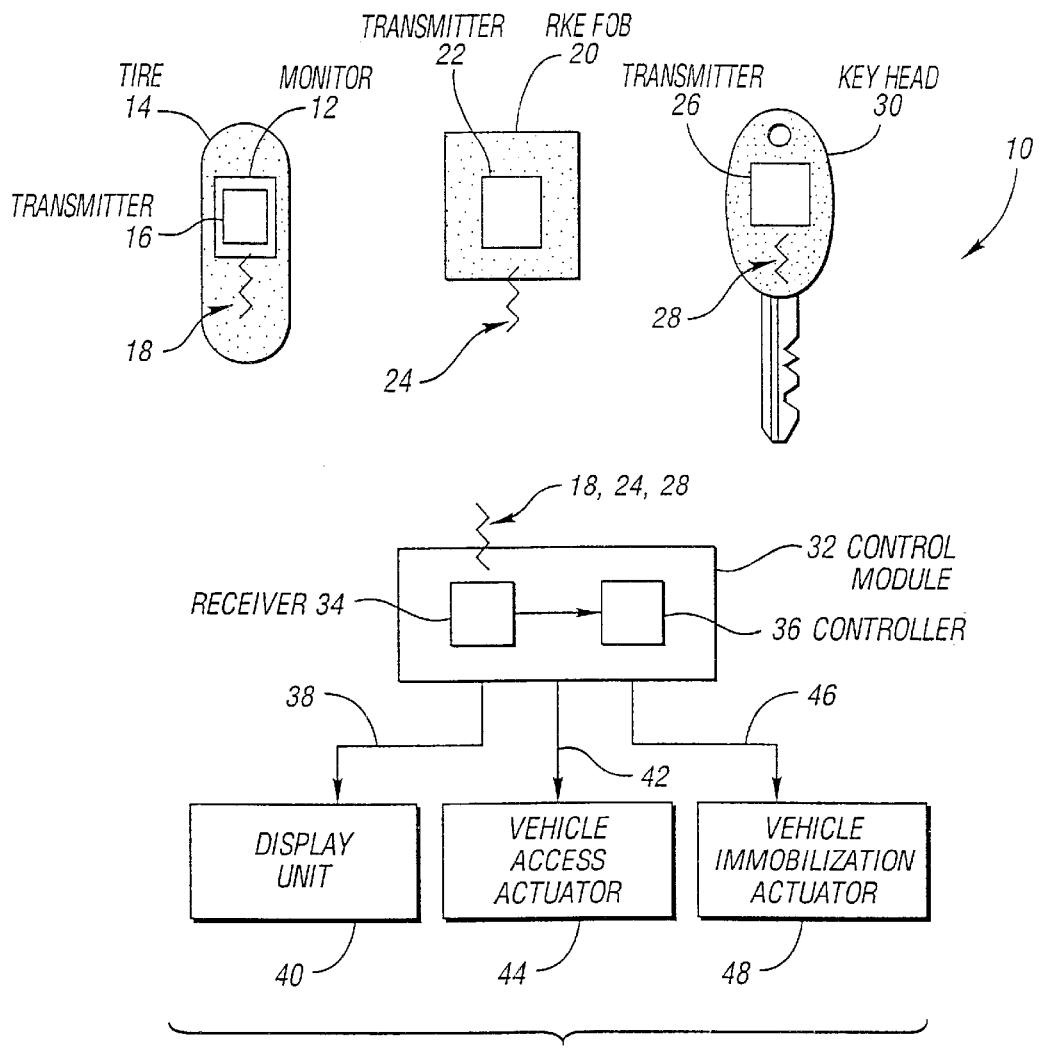
FIG. 1 is an overall block diagram of the combined vehicle access, tire monitoring and vehicle immobilization system of the present invention.

Referring to FIGS. 1–4, the preferred embodiment of the present invention will now be described. As previously noted, it is known in the automotive industry to provide for remote keyless entry (RKE) to a vehicle through the use of a hand held transmitter, which may be part of a separate RKE fob, or part of a vehicle ignition keyhead with a keyhead transponder for use in vehicle immobilization. Such transmitters generally utilize an antenna to transmit radio frequency (RF) signals to a vehicle in order to lock or unlock vehicle doors, open or close a vehicle sliding door, unlock a vehicle trunk, activate internal and/or external vehicle lights, and/or activate a "panic" alarm. Such RKE fobs typically employ on-off keying (OOK) or amplitude shift keying (ASK) modulation schemes for the RF signals.

As also previously noted, it is also known in the industry to provide for wireless monitoring of vehicle tire parameters, particularly tire pressure. In such tire monitoring systems, RF transmitters located inside each tire transmit information concerning tire parameter, such as pressure, to a receiver located in the vehicle, which information is ultimately displayed to a vehicle operator. Like vehicle remote access systems, such tire monitoring systems also typically employ OOK or ASK modulation schemes for the RF signals. With such modulation schemes, however, there can be strong adverse effects on signal reception, because the amplitude of a signal transmitted from a rotating tire can vary significantly during transmission.

Finally, as also noted previously, it is also known in the automotive industry to provide systems for vehicle immobilization to deter theft. Such anti-theft devices typically employ low frequency (LF) transponders in a vehicle ignition keyhead. Upon insertion of the vehicle ignition key into the vehicle ignition keyhole, an interrogation signal is sent by the vehicle. In response, the keyhead transponder transmits an encrypted code to a control unit on-board the vehicle. If the code sent by the transponder is valid (i.e., the control unit authenticates the received code), then the control unit permits the vehicle to be activated. However, if the code is not received by the control unit, or if the code is not valid (i.e., the control unit cannot authenticate the received code), then the control unit acts to immobilize the vehicle, for example by cutting off the fuel supply to the vehicle engine.

As noted, it would be desirable to provide a system and method for shared vehicle remote access, tire monitoring and vehicle immobilization. Such a combined system and method would provide an improved and simplified design for such functionality, thereby optimizing performance and providing a cost advantage. In particular, such a system and method would preferably employ a combined RKE, tire monitoring and vehicle immobilization receiver, as well as a single microprocessor controller. Such a system and method would preferably use an OOK or ASK modulation scheme for RKE, while employing a more advantageous frequency shift keying (FSK) modulation scheme for tire monitoring, thereby overcoming the problems of the prior art tire monitoring systems described above. Still further, such a system and method would also preferably provide an advantageous RF link for use in vehicle immobilization.

Referring now to FIG. 1, an overall block diagram of the combined vehicle access, tire monitoring and vehicle immobilization system of the present invention is shown, denoted generally by reference numeral 10. As seen therein, the system (10) includes a tire monitor (12) for mounting in a tire (14), preferably located inside the tire adjacent the tire inflation valve stem (not shown). Tire monitor (12) includes appropriate sensors and other devices for monitoring any number of tire parameters, such as tire pressure, temperature, status (i.e., whether or not the tire is in motion) and/or speed, in any fashion well known to those of ordinary skill in the art. Tire monitor (12) includes a transmitter (16) for transmitting a radio frequency (RF) tire data signal (18) representing information concerning the tire pressure, temperature, status and/or speed determined by tire monitor (12), which information, as described in greater detail below, is ultimately conveyed to a vehicle operator via a display. It should be noted that a single tire monitor (12) is shown in FIG. 1 only for the sake of simplicity. It is to be understood that, according to the present invention, tire monitors are preferably included in each vehicle tire.

As previously noted, the amplitude of tire data signal (18) coming from a rotating tire can vary significantly during transmission. This can have strong adverse effects on the ultimate reception of tire data signal (18) if it is encoded using on-off keying (OOK) or amplitude shift keying (ASK) modulation. To overcome this problem, the present invention preferably employs frequency shift keying (FSK) modulation to encode the tire data signal. It should be noted, however, that on-off keying (OOK) or amplitude shift keying (ASK) could also be used.

The combined vehicle access, tire monitoring and vehicle immobilization system (10) of the present invention also includes a hand held remote vehicle access transmitter (20). As shown in FIG. 1, transmitter (20) is a remote keyless entry (RKE) fob of the type typically employed in the automotive industry. It should be noted, however, that transmitter (20) may alternatively be included with a vehicle activation transponder (26) in a vehicle ignition keyhead (30) as described below, as is also well known in the industry. RKE fob (20) preferably includes a radio frequency (RF) transmitter (22) for transmitting an RF vehicle access signal (24) for use in performing any number of vehicle access functions, such as operating (i.e., locking or unlocking) a vehicle door lock, activating internal and/or external vehicle lights, operating (i.e., opening or closing) a vehicle sliding door, unlocking a vehicle trunk, activating a vehicle horn, activating a vehicle "panic" alarm, or other functions. In that regard, unlike the situation with tire data signal (18), amplitude changes are not a problem with vehicle access signal (24). As a result, frequency shift keying (FSK) modulation is not required for vehicle access signal (24). Instead, the present invention preferably utilizes on-off keying (OOK) or amplitude shift keying (ASK) modulation for vehicle access signal (24), although frequency shift keying (FSK) could also be used.

Still referring to FIG. 1, the system (10) of the present invention further includes a vehicle activation transponder (26) for receiving an interrogation signal and transmitting a vehicle activation signal (28) in the form of an encrypted, secret code, in a fashion well known in the art. In that regard, transponder (26) is located in a vehicle ignition keyhead (30). As a result of insertion of the vehicle ignition key into the vehicle ignition keyhole, an interrogation signal is sent from the vehicle. Upon receiving the interrogation signal, vehicle activation transponder (26) sends vehicle activation signal (28) representing the encrypted code. In that regard, vehicle activation transponder (26) may comprise a low frequency (LF), inductively coupled, battery-less transponder such that vehicle activation signal (28) is an LF signal. As used herein, LF includes frequencies up to about 15 Mhz.

As noted above, vehicle activation transponder (26) may be located in vehicle ignition keyhead (30) along with vehicle access transmitter (22). In that regard, it should be noted that a single microprocessor (not shown) could be used in keyhead (30) for both vehicle access transmitter (22) and vehicle activation transponder (26). Alternatively, a microprocessor could be used for vehicle access transmitter (22), while a transponder circuit could be used for vehicle activation transponder (26). Moreover, vehicle activation transponder (26) may also alternatively comprise a radio frequency (RF) transponder, such that vehicle activation signal (28) is an RF signal. In that regard, such an RF vehicle activation transponder (26) could be activated to send RF vehicle activation signal (28) by an LF transponder located in vehicle ignition keyhead (30). As described in greater detail below, the encrypted code represented by vehicle activation signal (28) is used in determining whether the vehicle should be immobilized, or disabled, such as by cutting of the fuel supply to the engine. In that regard, an RF vehicle activation signal (28) may be advantageously used in order to guarantee its reception by a control module (32) described below, thereby preventing inadvertent or undesired vehicle immobilization.

Referring still to FIG. 1, the system (10) also includes control module (32), including a receiver (34) provided in communication with a controller (36). Receiver (34) is operative to receive tire data signal (18), vehicle access signal (24) and vehicle activation signal (28). Controller (36) is operative to process tire data signal (18) from receiver (34), and to generate a display signal (38) operative to display the tire information represented by tire data signal (18) to a vehicle operator via a display unit (40), such as an LED or lighted icon in the vehicle dashboard or a vehicle console. It should be noted that the information displayed to the vehicle operator may include a warning, which may also be audible, if tire pressure and/or other tire parameters, such as temperature, are outside recommended ranges. Controller (36) is also operative to process vehicle access signal (24) from receiver (34) and to generate a vehicle access control signal (42) operative to activate a vehicle access actuator (44) in order to perform the desired vehicle access function. In that regard, actuator (44) may operate a vehicle door lock, door, lights, horn, alarm, or other device.

Similarly, controller (36) is further operative to process vehicle activation signal (28) from receiver (34). More particularly, in a fashion well known in the art, controller (36) is operative to decrypt and authenticate the vehicle activation signal (28). That is, controller (36) determines whether the code represented by the vehicle activation signal (28) is valid. If not, controller (36) is further operative to generate a vehicle immobilization signal (46), which is operative to activate a vehicle immobilization actuator (48) in order to immobilize the vehicle. In that regard, actuator (48) may operate to cut off the fuel supply to the vehicle engine, deactivate the vehicle throttle, or activate the vehicle brakes. It should be noted that controller (36) is preferably an appropriately programmed microprocessor, or an equivalent thereto. It should also be noted that while controller (36) preferably comprises a single microprocessor, thereby providing cost advantages, multiple microprocessors could also be used.

Figure 2:
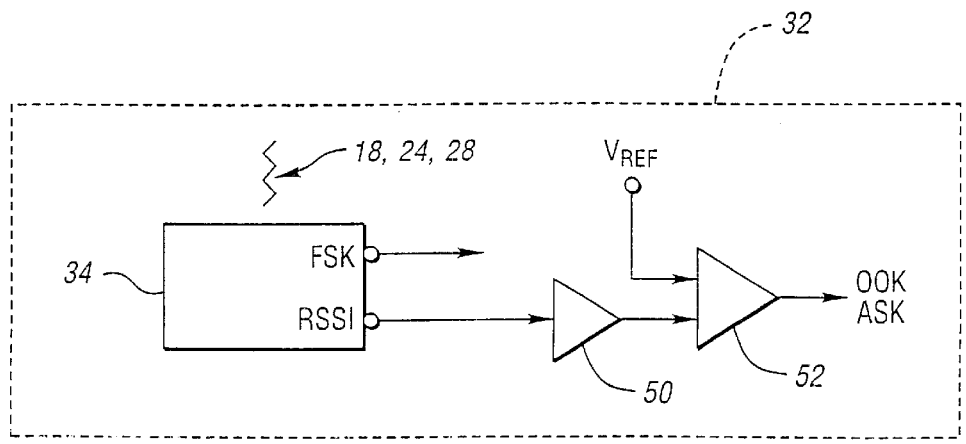
FIG. 2 is a simplified block diagram of the control module of the combined vehicle access, tire monitoring and vehicle immobilization system of the present invention.

Referring next to FIG. 2, a simplified block diagram of the control module of the combined vehicle access, tire monitoring and vehicle immobilization system of the present invention is shown. As seen therein, and as previously described in conjunction with FIG. 1, control module (32) includes receiver (34) for receiving tire data, vehicle access, and vehicle activation signals (18, 24, 28). As previously described, tire data signal (18) is preferably an FSK modulated signal, while vehicle access signal (24) is preferably an OOK or ASK modulated signal. According to the present invention, control module (32) is capable of receiving and processing both types of signals. In that regard, control module (32) preferably further comprises an amplifier (50) and a data slicer, preferably in the form of a comparator (52). Receiver (34) preferably includes a radio frequency (RF) integrated circuit (not shown) that is an FSK demodulator and which includes a received signal strength indicator (ROSS). As a result, FSK data from the tire data signal (18) can be accessed through a data output pin of the integrated circuit, and OOK or ASK data from the vehicle access signal (24) can be received by connecting output from the ROSS to amplifier (50) followed by comparator (52).

In such a fashion, a single RF integrated circuit can be used to detect both FSK and OOK or ASK signals depending only on the type of incoming signal, thereby providing a low cost means for implementing the use of both FSK (for tire monitoring) and OOK or ASK (for vehicle access) signals in a combined system. While the above described embodiment is preferred, it should be noted that multiple integrated circuits could also be employed. For example, two integrated circuits could be used, one for receiving RF tire data and vehicle access signals (OOK, ASK or FSK), and another for receiving an LF vehicle activation signal. Alternatively, three integrated circuits could also be used, one for receiving an FSK modulated tire data signal, another for receiving an OOK or ASK modulated vehicle access signal, and still another for receiving an LF vehicle activation signal.

Figure 3:
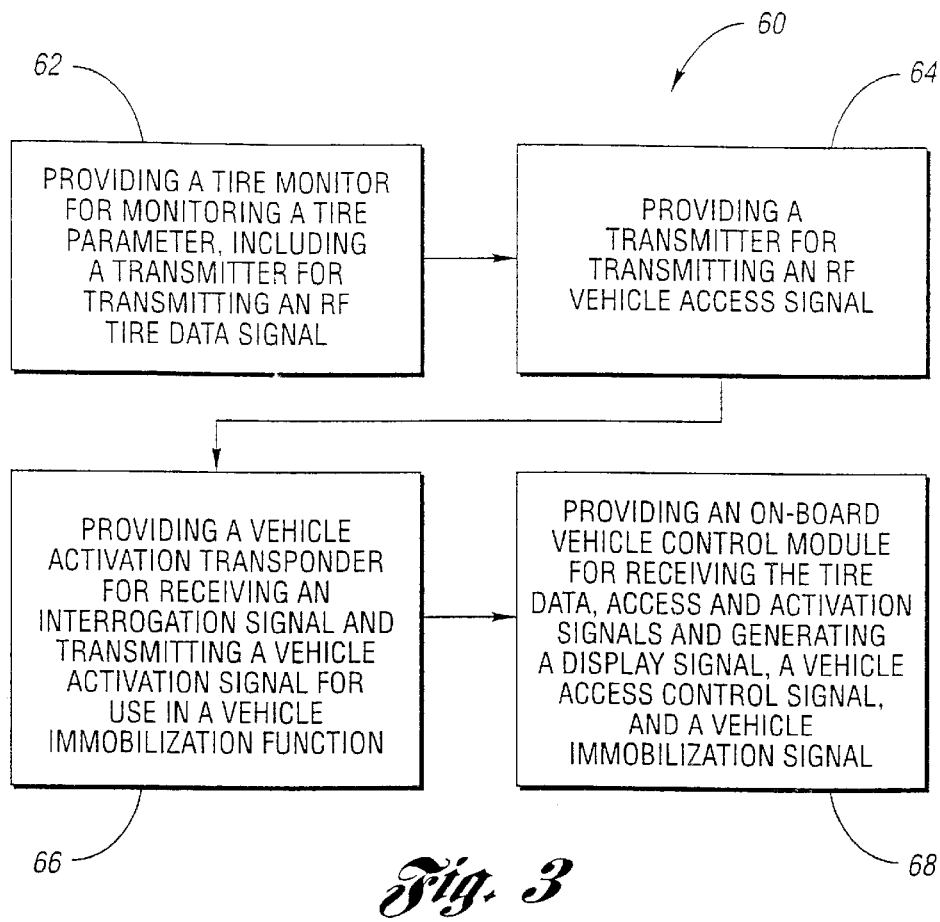
FIG. 3 is a simplified flowchart of the combined vehicle access, tire monitoring and vehicle immobilization method of the present invention.

Referring next to FIG. 3, a simplified flowchart of the combined vehicle access, tire monitoring and vehicle immobilization method of the present invention is shown, denoted generally by reference numeral 60. As seen therein, the method (60) includes, as described above, providing (62) a tire monitor for mounting in a vehicle tire for monitoring at least one tire parameter, such as tire pressure, temperature, status and/or speed. The monitor including a transmitter which preferably employs frequency shift keying (FSK) modulation (although on-off keying (OOK) or amplitude shift keying (ASK) could also be used) for transmitting a radio frequency (RF) tire data signal representing information concerning the at least one tire parameter. The method (60) of the present invention further includes providing (64) a hand held remote vehicle access transmitter for transmitting an RF vehicle access signal for use in performing at least one vehicle access function, which may include operating (i.e., locking or unlocking) a vehicle door lock, activating internal and/or external vehicle lights, operating (i.e., opening or closing) a vehicle sliding door, unlocking a vehicle trunk, activating a vehicle horn, activating a vehicle "panic" alarm, or other functions. In that regard, the vehicle access transmitter preferably employs either on-off keying (OOK) or amplitude shift keying (ASK) modulation for encoding the vehicle access signal, although frequency shift keying (FSK) could also be used.

Still referring to FIG. 3, the method (60) also includes providing (66) a vehicle activation transponder for receiving an interrogation signal and transmitting a vehicle activation signal for use in a vehicle immobilization function. The vehicle activation transponder may comprise a low frequency (LF), inductively coupled, battery-less transponder located in a vehicle ignition keyhead, such that the vehicle activation signal comprises an LF signal. Alternatively, however, vehicle activation transponder may comprise a radio frequency (RF) transponder, thereby transmitting a vehicle activation signal (28) that is an RF signal. In yet another alternative embodiment, an RF vehicle activation transponder may be activated to transmit an RF vehicle activation signal by an LF transponder located in vehicle ignition keyhead (30).

As seen in FIG. 3, the method (60) of the present invention still further includes providing (68) a control module for mounting on-board the vehicle, the control module including a receiver for receiving the tire data, vehicle access, and vehicle activation signals, and a controller for processing the tire data, vehicle access, and vehicle activation signals and generating a display signal operative to display to a vehicle operator the information represented by the tire data signal, a vehicle access control signal operative to perform the at least one vehicle access function, and a vehicle immobilization control signal operative to immobilize the vehicle if the controller fails to authenticate the vehicle activation signal. In that regard, the control module preferably further comprises an amplifier and a data slicer, and the receiver preferably comprises an integrated circuit including a frequency shift keying demodulator for demodulating the tire data signal, and a received signal strength indicator for providing a received signal strength output signal to the data slicer through the amplifier for demodulating the vehicle access signal. In such a fashion, as described in detail above, a single RF integrated circuit can be used to detect both FSK and OOK or ASK signals depending only on the type of incoming signal, thereby providing a low cost means for implementing the use of both FSK (for tire monitoring) and OOK or ASK (for vehicle access) signals in a combined vehicle remote access, tire monitoring, and vehicle immobilization system and method. As previously described, however, a number of alternative configurations and modulation schemes could also be used.

Figure 4A:
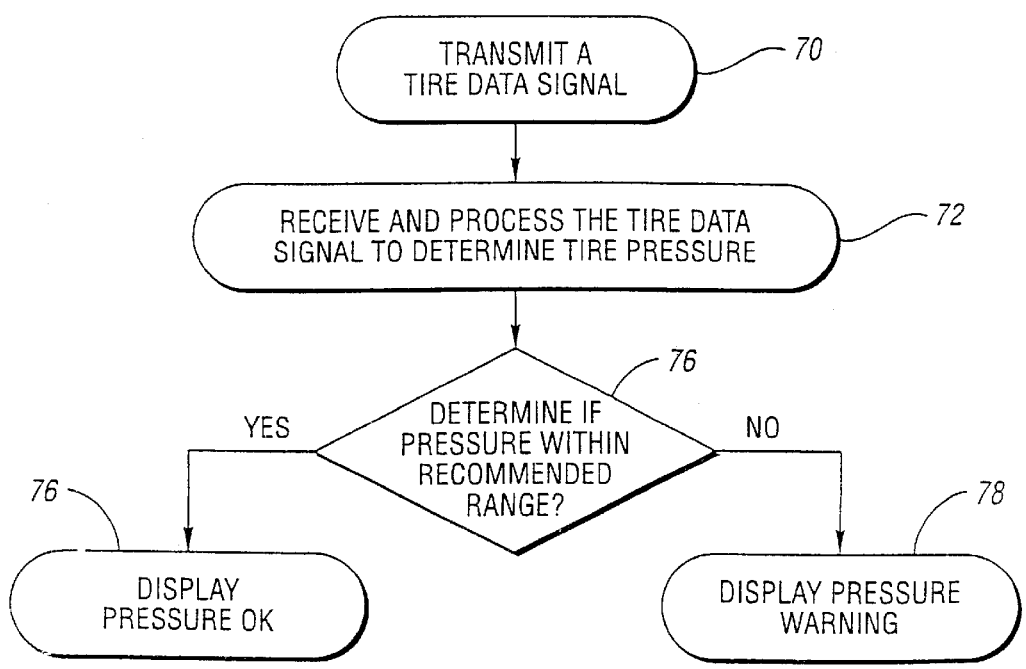
FIGS. 4a–c are simplified flowcharts illustrating operations of the combined vehicle access, tire monitoring and vehicle immobilization method of the present invention.
Figure 4B:
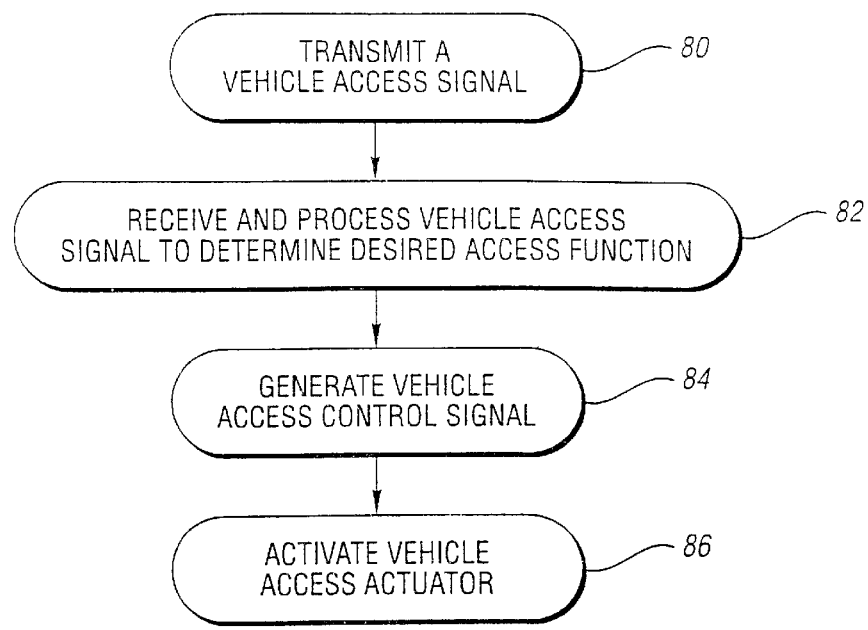
Figure 4C:
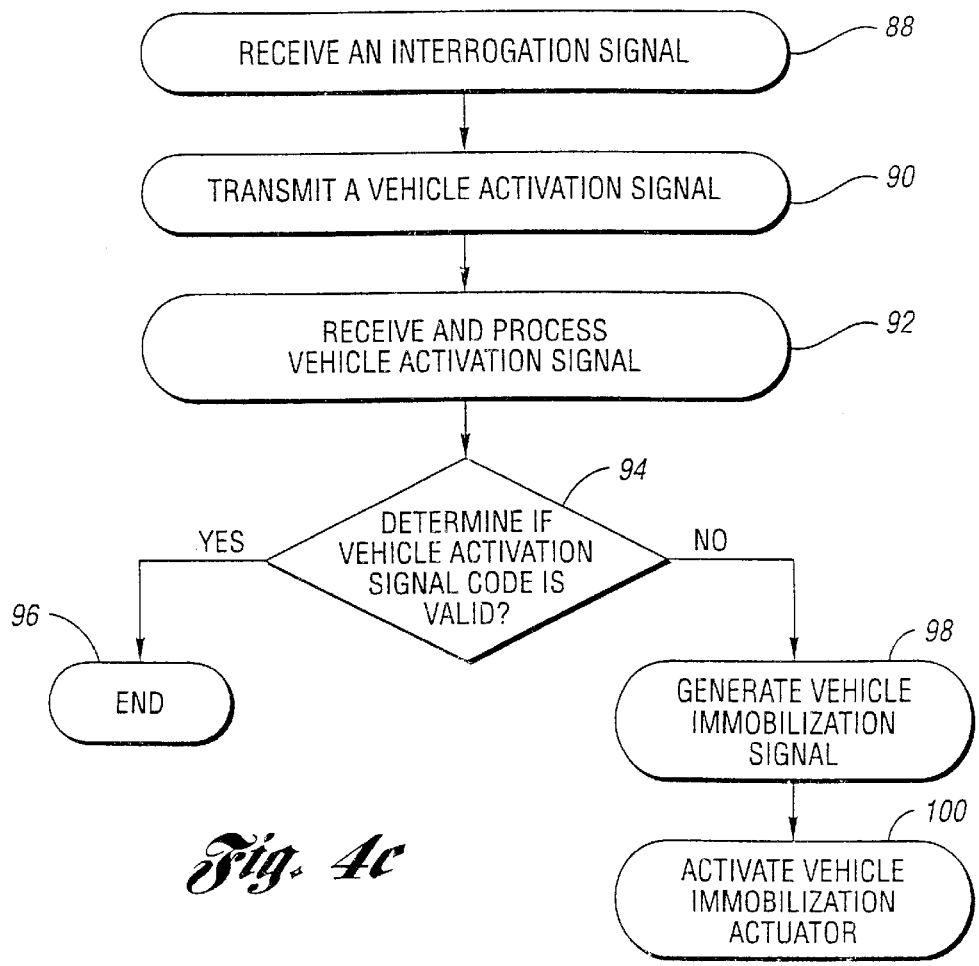

Referring finally to FIGS. 4a–c, simplified flowcharts illustrating operations of the combined vehicle access, tire monitoring and vehicle immobilization method of the present invention are shown. As seen in FIG. 4a, the radio frequency (RF) tire data signal is transmitted (70) by the tire monitor, and subsequently received and processed (72) by the control module as described in detail above to determine any number of tire parameters, including pressure, temperature, status and/or speed. In that regard, it may be determined (74) if the tire pressure is within the recommended operating range. If so, a information to that effect is displayed (76) to the vehicle operator. If not, a warning may be displayed (78) to the vehicle operator. Such a warning display may be accompanied by an audible signal. As previously described, frequency shift keying (FSK) is utilized to transmit the tire data signal.

As seen in FIG. 4b, the RF vehicle access signal is transmitted (80) by the remote keyless entry (RKE) fob, and subsequently received and processed (82) by the control module as described in detail above to determine the nature of the vehicle access function desired by a vehicle operator, which may include operating (i.e., locking or unlocking) a vehicle door lock, activating internal and/or external vehicle lights, operating (i.e., opening or closing) a vehicle sliding door, unlocking a vehicle trunk, activating a vehicle horn, activating a vehicle "panic" alarm, or other functions. Thereafter, a vehicle access control signal is generated (84) in order to activate (86) the appropriate vehicle access actuator, such as a door lock or light, to perform the desired vehicle access function. As previously described, on-off keying (OOK) or amplitude shift keying (ASK) is utilized to modulate the vehicle access signal.

Finally, as seen in FIG. 4c, after receipt (88) of an interrogation signal, the vehicle activation signal is transmitted (90), such as from a vehicle activation transponder located in a vehicle ignition keyhead, and subsequently received and processed (92) by the control module as described in detail above to determine whether the vehicle should be immobilized. In that regard, it is determined (94) whether the code represented by the vehicle activation signal is valid. If so, no action is undertaken to disable the vehicle (96). If not, a vehicle immobilization signal is generated (98) in order to activate (100) the appropriate vehicle immobilization actuator to disable the vehicle, such as by cutting off the fuel supply to the vehicle engine, deactivating the vehicle throttle, or activating the vehicle brakes.

From the foregoing description, it can be seen that the present invention provides a system and method for shared vehicle remote access, tire monitoring and vehicle immobilization functions that improves performance and reduces expense. In that regard, the present invention preferably employs a combined remote keyless entry (RKE), tire monitoring and vehicle immobilization receiver, as well as a single microprocessor controller. The present invention also preferably uses an on-off keying (OOK) or amplitude shift keying (ASK) modulation scheme for RKE, while preferably employing a more advantageous frequency shift keying (FSK) modulation scheme for tire monitoring, and provides either a low frequency (LF) or a radio frequency (RF) link for use in vehicle immobilization. In such a fashion, the present invention preferably combines the above vehicle functions in one module using a single microprocessor controller, yet still advantageously uses two different modulation schemes for tire monitoring and remote access for optimum operation of each application, while simultaneously improving and simplifying the vehicle immobilization function by providing an RF link.

While various embodiments of the invention have been illustrated and described, it is not intended that these embodiments illustrate and describe all possible forms of the present invention. Rather, the words used in the specification are words of description rather than limitation, and it is understood that various changes may be made without departing from the spirit and scope of the invention. Indeed, many alternatives, modifications, and variations will be apparent to those skilled in the art in light of the foregoing description, and the present invention is intended to embrace all such alternatives.

What is claimed is:

1. For use with an automotive vehicle, a combined vehicle remote access, tire monitoring and vehicle immobilization system comprising:

a tire monitor for mounting in a vehicle tire for monitoring at least one tire parameter, the monitor including a transmitter for transmitting a radio frequency tire data signal representing information concerning the at least one tire parameter, wherein the tire monitor transmitter utilizes frequency shift keying modulation;

a handheld remote vehicle access transmitter for transmitting a radio frequency vehicle access signal for use in performing at least one vehicle access function;

a vehicle activation transponder for receiving an interrogation signal and transmitting a vehicle activation signal for use in a vehicle immobilization function; and a control module for mounting on-board the vehicle, the control module including a receiver for receiving the tire data, vehicle access, and vehicle activation signals, and a controller for processing the tire data, vehicle access, and vehicle activation signals and generating a display signal operative to display to a vehicle operator the information represented by the tire data signal, a vehicle access control signal operative to perform the at least one vehicle access function, and a vehicle immobilization control signal operative to immobilize the vehicle if the controller fails to authenticate the vehicle activation signal, wherein the control module further comprises an amplifier and a data slicer, and wherein the receiver comprises an integrated circuit including a frequency shift keying demodulator for demodulating the tire data signal, and a received signal strength indicator for providing a received signal strength output signal to the data slicer through the amplifier for demodulating the vehicle access signal.

2. The combined vehicle remote access, tire monitoring and vehicle immobilization system of claim 1 wherein the at least one tire parameter includes pressure.

3. The combined vehicle remote access, tire monitoring and vehicle immobilization system of claim 1 wherein the remote vehicle access transmitter utilizes signal modulation from the group consisting of on-off keying and amplitude shift keying.

4. The combined vehicle remote access, tire monitoring and vehicle immobilization system of claim 1 wherein the at least one vehicle access function include operating a vehicle door lock and activating a vehicle alarm.

5. The combined vehicle remote access, tire monitoring and vehicle immobilization system of claim 1 wherein the vehicle activation transponder comprises a battery-less, inductively coupled transponder and the vehicle activation signal comprises a low frequency signal.

6. The combined vehicle remote access, tire monitoring and vehicle immobilization system of claim 1 wherein the vehicle activation transponder comprises a radio frequency transponder and the vehicle activation signal comprises a radio frequency signal.

7. The combined vehicle remote access, tire monitoring and vehicle immobilization system of claim 6 further comprising a transponder for transmitting a low frequency signal operative to activate the vehicle activation transponder for transmitting the vehicle activation signal.

8. The combined vehicle remote access, tire monitoring and vehicle immobilization system of claim 1 wherein the vehicle access transmitter and the vehicle activation transponder are located in a vehicle ignition keyhead.

9. For use with an automotive vehicle, a method for combined vehicle remote access, tire monitoring and vehicle immobilization comprising:

providing a tire monitor for mounting in a vehicle tire for monitoring at least one tire parameter, the monitor including a transmitter for transmitting a radio frequency tire data signal representing information concerning the at least one tire parameter, wherein the tire monitor transmitter utilizes frequency shift keying modulation;

providing a handheld remote vehicle access transmitter for transmitting a radio frequency vehicle access signal for use in performing at least one vehicle access function;

providing a vehicle activation transponder for receiving an interrogation signal and transmitting a vehicle activation signal for use in a vehicle immobilization function; and providing a control module for mounting on-board the vehicle, the control module including a receiver for receiving the tire data, vehicle access, and vehicle activation signals, and a controller for processing the tire data, vehicle access, and vehicle activation signals and generating a display signal operative to display to a vehicle operator the information represented by the tire data signal, a vehicle access control signal operative to perform the at least one vehicle access function, and a vehicle immobilization control signal operative to immobilize the vehicle if the controller fails to authenticate the vehicle activation signal, wherein the control module further comprises an amplifier and a data slicer, and wherein the receiver comprises an integrated circuit including a frequency shift keying demodulator for demodulating the tire data signal, and a received signal strength indicator for providing a received signal strength output signal to the data slicer through the amplifier for demodulating the vehicle access signal.

10. The combined vehicle remote access, tire monitoring and vehicle immobilization method of claim 9 wherein the at least one tire parameter includes pressure.

11. The combined vehicle remote access, tire monitoring and vehicle immobilization method of claim 9 wherein the vehicle access signal comprises a radio frequency signal and the remote vehicle access transmitter utilizes signal modulation from the group consisting of on-off keying and amplitude shift keying.

12. The combined vehicle remote access, tire monitoring and vehicle immobilization method of claim 9 wherein the at least one vehicle access function includes operating a vehicle door lock and activating a vehicle alarm.

13. The combined vehicle remote access, tire monitoring and vehicle immobilization method of claim 9 wherein the vehicle activation transponder comprises a battery-less, inductively coupled transponder and the vehicle activation signal comprises a low frequency signal.

14. The combined vehicle remote access, tire monitoring and vehicle immobilization method of claim 9 wherein the vehicle activation transponder comprises a radio frequency transponder and the vehicle activation signal comprises a radio frequency signal.

15. The combined vehicle remote access, tire monitoring and vehicle immobilization method of claim 14 further comprising providing a transponder for transmitting a low frequency signal operative to activate the vehicle activation transponder for transmitting the vehicle activation signal.

16. The combined vehicle remote access, tire monitoring and vehicle immobilization method of claim 9 wherein the vehicle access transmitter and the vehicle activation transponder are located in a vehicle ignition keyhead.

* * * * *

UNITED STATES PATENT AND TRADEMARK OFFICE
CERTIFICATE OF CORRECTION

PATENT NO. : 6,420,967 B1 Page 1 of 1
DATED : July 16, 2002
INVENTOR(S) : Ghabra et al.

It is certified that error appears in the above-identified patent and that said Letters Patent is hereby corrected as shown below:

Column 9,
Line 56, "include" should read -- includes --

Signed and Sealed this

Fifteenth Day of October, 2002

Attest:

Attesting Officer

JAMES E. ROGAN
Director of the United States Patent and Trademark Office